United States Patent
Lin et al.

(10) Patent No.: US 11,816,888 B2
(45) Date of Patent: *Nov. 14, 2023

(54) ACCURATE TAG RELEVANCE PREDICTION FOR IMAGE SEARCH

(71) Applicant: Adobe Inc., San Jose, CA (US)

(72) Inventors: Zhe Lin, Fremont, CA (US); Xiaohui Shen, San Jose, CA (US); Jonathan Brandt, Santa Cruz, CA (US); Jianming Zhang, Newton, MA (US); Chen Fang, Santa Clara, CA (US)

(73) Assignee: Adobe Inc., San Jose, CA (US)

( * ) Notice: Subject to any disclaimer, the term of this patent is extended or adjusted under 35 U.S.C. 154(b) by 765 days.

This patent is subject to a terminal disclaimer.

(21) Appl. No.: 16/853,111

(22) Filed: Apr. 20, 2020

(65) Prior Publication Data
US 2020/0250465 A1 Aug. 6, 2020

Related U.S. Application Data

(63) Continuation of application No. 15/043,174, filed on Feb. 12, 2016, now Pat. No. 10,664,719.

(51) Int. Cl.
*G06F 16/51* (2019.01)
*G06F 16/28* (2019.01)
(Continued)

(52) U.S. Cl.
CPC ........ *G06V 20/35* (2022.01); *G06F 16/24578* (2019.01); *G06F 16/285* (2019.01);
(Continued)

(58) Field of Classification Search
None
See application file for complete search history.

(56) References Cited

U.S. PATENT DOCUMENTS

| 8,965,116 B2 | 2/2015 | Ribnick et al. |
| 9,483,500 B2 | 11/2016 | Brucher et al. |

(Continued)

FOREIGN PATENT DOCUMENTS

| CN | 102089761 A | 6/2011 |
| CN | 103168227 A | 6/2013 |

OTHER PUBLICATIONS

Duygulu, P. et al., "Object recognition as machine transition: Learning a lexicon for a fixed image vocabulary," European Conf. on Computer Vision (2002) 16 pp. (Year: 2002).

(Continued)

*Primary Examiner* — Brian M Smith
(74) *Attorney, Agent, or Firm* — Shook, Hardy & Bacon L.L.P.

(57) ABSTRACT

Embodiments of the present invention provide an automated image tagging system that can predict a set of tags, along with relevance scores, that can be used for keyword-based image retrieval, image tag proposal, and image tag autocompletion based on user input. Initially, during training, a clustering technique is utilized to reduce cluster imbalance in the data that is input into a convolutional neural network (CNN) for training feature data. In embodiments, the clustering technique can also be utilized to compute data point similarity that can be utilized for tag propagation (to tag untagged images). During testing, a diversity based voting framework is utilized to overcome user tagging biases. In some embodiments, bigram re-weighting can down-weight a keyword that is likely to be part of a bigram based on a predicted tag set.

19 Claims, 9 Drawing Sheets

(51) Int. Cl.

| | |
|---|---|
| *G06F 16/2457* | (2019.01) |
| *G06F 16/583* | (2019.01) |
| *G06F 18/2113* | (2023.01) |
| *G06F 18/21* | (2023.01) |
| *G06F 18/23213* | (2023.01) |
| *G06F 18/2413* | (2023.01) |
| *G06N 3/045* | (2023.01) |
| *G06N 20/10* | (2019.01) |
| *G06V 20/00* | (2022.01) |
| *G06V 10/762* | (2022.01) |
| *G06V 10/764* | (2022.01) |
| *G06N 3/08* | (2023.01) |

(52) U.S. Cl.
CPC ............ *G06F 16/51* (2019.01); *G06F 16/583* (2019.01); *G06F 18/217* (2023.01); *G06F 18/2113* (2023.01); *G06F 18/23213* (2023.01); *G06F 18/24147* (2023.01); *G06N 3/045* (2023.01); *G06N 3/08* (2013.01); *G06V 10/763* (2022.01); *G06V 10/764* (2022.01); *G06N 20/10* (2019.01)

(56) References Cited

U.S. PATENT DOCUMENTS

| | | | |
|---|---|---|---|
| 2008/0010291 | A1 | 1/2008 | Poola |
| 2013/0346409 | A1 | 12/2013 | Welinder et al. |
| 2015/0331929 | A1 | 11/2015 | El-Saban et al. |
| 2015/0356199 | A1 | 12/2015 | Mei et al. |

OTHER PUBLICATIONS

Ricotta et al., "Diversity Partitioning of Rao's Quadratic Entropy," Theoretical Population Biology 76 (2009), pp. 299-302, Rome, Italy.

Levenshtein, "Binary Codes Capable of Correcting Deletions, Insertions, and Reversals," Soviet Physics Doklady, Translation from the Proceedings of the Academy of Sciences of the USSR, Feb. 1966, pp. 707-710, vol. 10, No. 8, Russian Original vol. 163, Nos. 4-6, Aug. 1965, Published by the American Institute of Physics Incorporated.

John Wiley & Sons, "Multivariate Analysis to Plackett and Burman Designs," Encyclopedia of Statistical Sciences, vol. 6, 1985, pp. 581-591, a Wiley-Interscience Publication, New York.

Anderson, A. et al., "TagEz: Flickr tag recommendation." Association for the Advancement of Artificial Intelligence (2008) 5 pp.

Chee, S.H.S et al., "RecTree: an efficient collaborative filtering method." Intl. Conf. on Data Warehousing and Knowledge Discovery (2001) pp. 141-151.

Guillaumin, M. et al., "Tag Prop: Discriminative metric learning in nearest neighbor models for image auto-annotation." IEEE 12th Intl. Conf. on Computer Vision (2009) pp. 309-316.

Jiang, B. et al., "Estimating the confidence interval for prediction errors of support vector machine classifiers." Journal of Machine Learning Research (2008) pp. 521-540.

Kaptein, A.M., "Effective focused retrieval by exploiting query context and document structure." PhD Thesis, FNWI: Institute for Logic, Language, and Computation (2011) pp. 117-142.

Lakkaraju, H. et al., "A bayesian framework for modeling human evaluations." Proceedings of the 2015 SIAM Intl. Conf. on Data Mining (2015) pp. 181-189.

Moreno, P.G., "Bayesian nonparametrics for crowdsourcing." PhD Thesis, Universidad Carlos III de Madrid. (2015) 163 pp.

Nguyen, N., "Consensus clusterings." Seventh IEEE Intl. Conf. on Data Mining (2007) pp. 607-612.

Xu, L. et al., "Retrieval of Soil Water Content in Saline Soils from Emitted Thermal Infrared Spectra Using Partial Linear Squares Regression." Remote Sensing vol. 7 No. 11 (2015) pp. 14646-14662.

Zhang, H. et al., "SVM-KNN: Discriminative nearest neighbor classification for visual category recognition." 2006 IEEE Computer Society Conf. on Computer Vision and Pattern Recognition (2006) vol. 2, pp. 2126-2136.

Abdallah, L. et al., "An ensemble-clustering-based distance metric and its applications," Intl. Journal of Business Intelligence and Data Mining, vol. 8, No. 3 (2013) pp. 264-287.

Raykar, V. et al., "Eliminating spammers and ranking annotators for crowdsourced labeling tasks," Journal of Machine Learning Research, vol. 13 (2012) pp. 491-518.

Ball, G. H., & Hall, D. J. (1965). ISODATA, a novel method of data analysis and pattern classification. Stanford research inst Menlo Park CA.

Berkhin, P. (2006). A survey of clustering data mining techniques. In Grouping multidimensional data (pp. 25-71). Springer, Berlin, Heidelberg.

Bradley, P. S., Bennett, K. P., & Demiriz, A. (2000). Constrained k-means clustering. Microsoft Research, Redmond, 1-8.

Liang, J., Bai, L., Dang, C., & Cao, F. (2012). The K-Means-Type Algorithms Versus Imbalanced Data Distributions. IEEE Transactions on Fuzzy Systems, 20(4), 728-745.

Welinder, P., Branson, S., Perona, P., & Belongie, S. J. (2010). The multidimensional wisdom of crowds. In Advances in neural information processing systems (pp. 2424-2432).

Xu, D., & Tian, Y. (2015). A comprehensive survey of clustering algorithms. Annals of Data Science, 2(2), 165-193.

Yan, Y., Rosales, R., Fung, G., Schmidt, M., Hermosillo, G., Bogoni, L., . . . & Dy, J. (Mar. 2010). Modeling annotator expertise: Learning when everybody knows a bit of something. In Proceedings of the Thirteenth International Conference on Artificial Intelligence and Statistics (pp. 932-939).

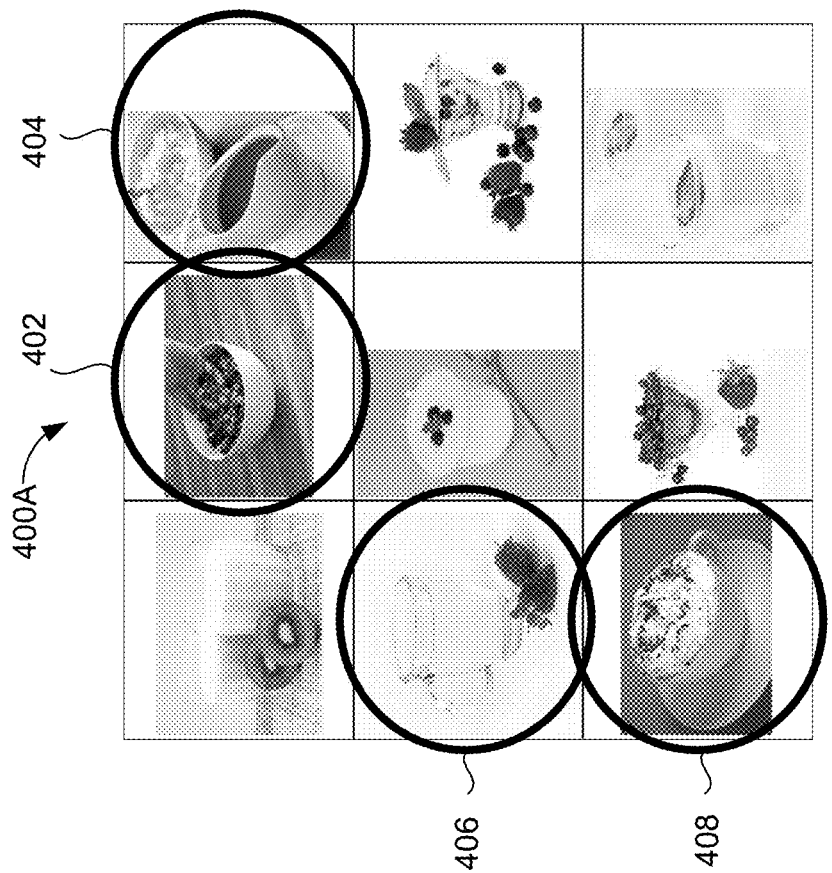
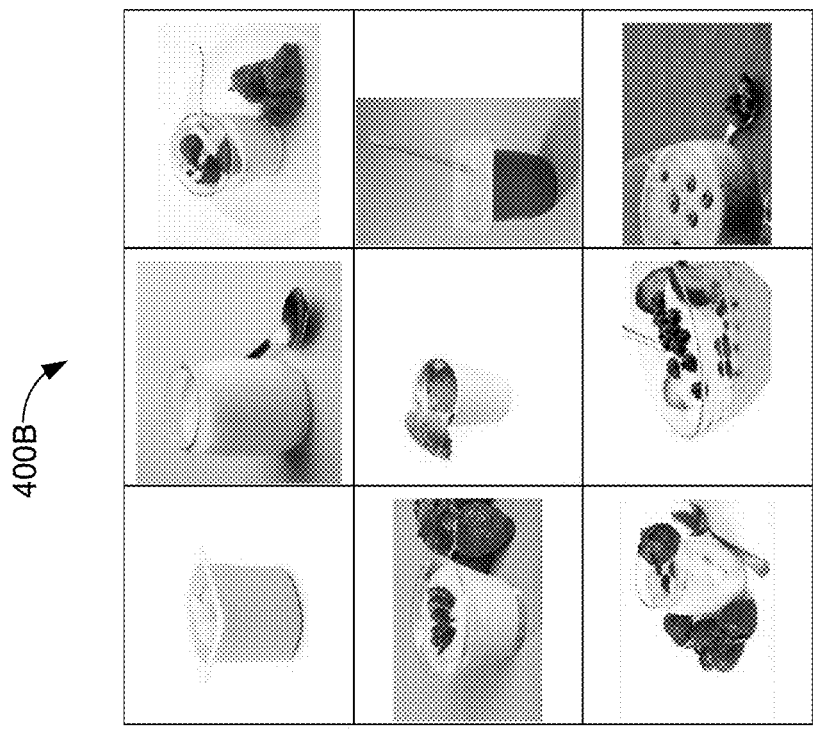
FIG. 4A
FIG. 4B

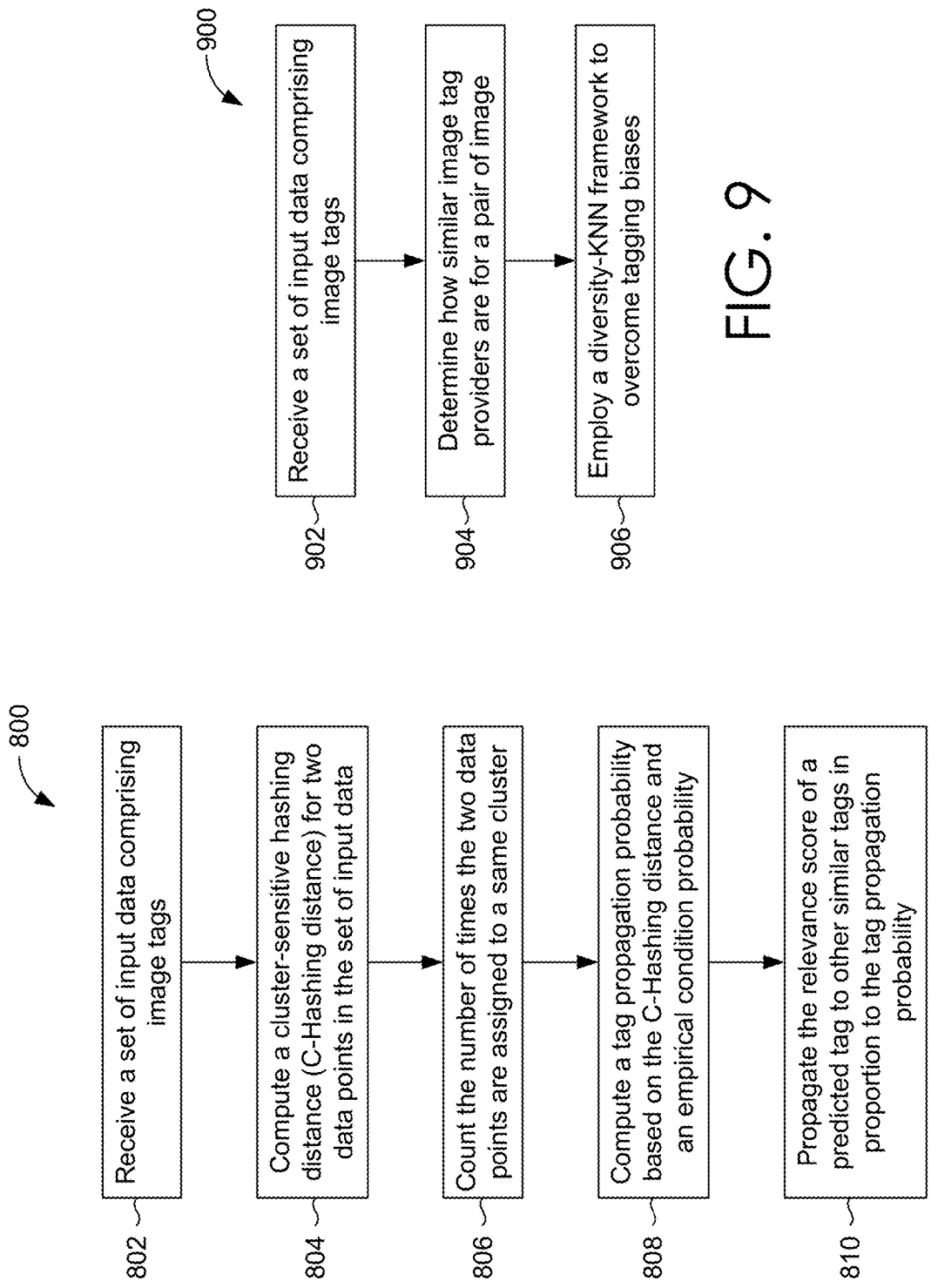

ACCURATE TAG RELEVANCE PREDICTION FOR IMAGE SEARCH

CROSS-REFERENCE TO RELATED APPLICATION

This application is a continuation of U.S. patent application Ser. No. 15/043,174, filed Feb. 12, 2016, which is assigned or under obligation of assignment to the same entity as this application, and which is incorporated in this application by reference in the entirety.

BACKGROUND

Internet-based search engines traditionally employ common image search techniques for locating digital image content on the World Wide Web. One of these well-known image search techniques can be categorized as "text-based" image searches. Traditional text-based image searches may receive a text-based query used for searching a database having keyword-tagged images to generate a resulting set of images that each has one or more keyword tags matching the text-based query. These text-based searches rely primarily on the quality and the level of detail of the keyword tags in the image database on which the search is conducted. These keyword tags are often provided by automated tagging systems.

Current tagging systems treat tagging as an image classification problem. In these systems, a large number of sample or training images are collected for each possible tag. A classifier can then be trained to determine the most likely tag for a given test image (e.g., an image that has not yet been tagged). However, when the number of tags is very large (e.g., greater than 10000), training each classifier is computationally challenging. Additionally, these systems often ignore rare tags and are unable to assign very specific tags for a given image. Further, the keyword tags propagated by these systems can be corrupted when similar images are annotated by similar annotators. In these instances, even if the images have some differences, because of the similarity of the images and the annotators, they may be annotated with the same tags, commonly referred to as tagging biases. Even further, large sets of data are often clustered to group similar data points that can be utilized by the classifier to distinguish one group (e.g., tag) from another. However, current clustering algorithms often result in imbalanced data, where a majority of data points (e.g, images) are in the same cluster, leaving other clusters with few or no data points (e.g., images). As a result of these and other limitations, such systems are often inadequate in tagging and retrieving real-world images.

SUMMARY

This summary is provided to introduce a selection of concepts in a simplified form that are further described below in the Detailed Description. This summary is not intended to identify key features or essential features of the claimed subject matter, nor should it be used as an aid in determining the scope of the claimed subject matter.

Embodiments of the present invention relate to image tagging systems. In particular, embodiments of the present invention provide an automated image tagging system that can predict a set of tags, along with relevance scores, that can be used for keyword-based image retrieval, image tag proposal, and image tag auto-completion based on user input. An enhanced clustering technique is utilized to remove cluster imbalance and improve training of a classifier that is utilized to predict tags and relevance scores for an image. As described above, cluster imbalance is a problem that happens when a large number of data points are concentrated in a small number of clusters. Cluster imbalance results in inefficiency during training as well as inaccuracy during testing. Consequently, a solution is proposed that enforces a size upper bound on clusters that results by (a) removing a subset of clusters of a particular size, and (b) recursively applying KMeans clustering on any remaining dominant clusters. In this way, when the data is input into a convolutional neural network (CNN), the CNN is able to more effectively distinguish between a large number of tags present in the training data which also enables the CNN to more accurately tag untagged images during testing.

An enhanced voting framework can then be utilized to overcome user tagging biases. As described above, user tagging bias is a problem that happens when the set of training images have been tagged by similar annotators or similar tag providers. A solution is proposed that addresses user tagging biases by employing a diversity-based voting framework. In particular, under this framework, the similarity in tag sequences can be considered for a pair of images. This enables the similarity between the tag providers to be determined. Accordingly, rather than utilize a similar vote count to determine when to tag an image, an effective number of votes can be measured that eliminates similar users in the vote count and, as a result, reduces tagging biases.

BRIEF DESCRIPTION OF THE DRAWINGS

The present invention is described in detail below with reference to the attached drawing figures, wherein:

FIGS. 4A-4B and 5A-5B are diagrams illustrating exemplary results indicating the difference between the baseline KNN voting scheme and the Div-KNN voting scheme in accordance with an embodiment of the present invention;

FIG. 8 is a flow diagram showing a method for improving tag prediction performance for rare tags in accordance with an embodiment of the present invention;

FIG. 9 is a flow diagram showing a method for addressing user tagging biases in accordance with an embodiment of the present invention.

DETAILED DESCRIPTION

Figure 1:
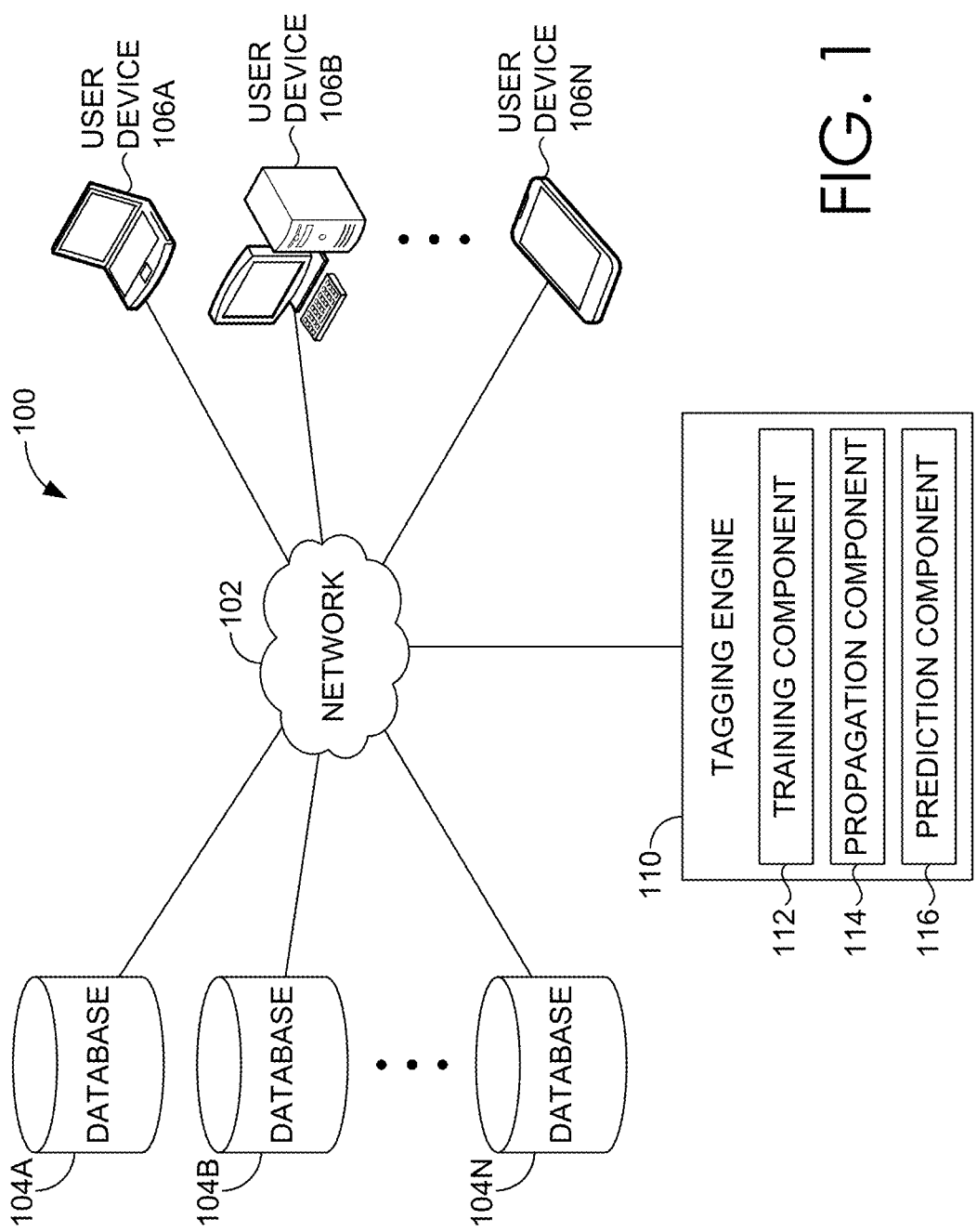
FIG. 1 is a block diagram showing a tagging system that can be utilized for keyword-based image retrieval, image tag proposal, and image tag auto-completion in accordance with embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

As noted in the Background, current tagging systems typically fall short in their usefulness because they are corrupted by tagging biases and imbalanced data which can affect both training and testing of image retrieval systems. These systems treat tagging as an image classification problem where a number of training images are collected for each tag (class) and a binary classifier is trained to compute the probability of the tag given an image independently. However, when the number of tags is very large (e.g., greater than 10000), training each classifier is computationally challenging. Because of the number of tags is so large, conventional tagging systems typically apply clustering algorithms in preprocessing to make the data more manageable. However, in many instances, applying the typical clustering algorithms (e.g., KMeans) to the training data results in imbalanced clusters (i.e., where a small number of dominant clusters contain a majority of the data points) which causes poor predictive performance, especially for rare or very specific tags. These deficiencies ultimately result in less accurate image retrieval.

For image tagging, the most recent scalable auto-tagging systems typically perform a visual similarity search in a large scale, tagged image database using a trained convolutional neural network (CNN). After retrieving similar images (e.g., the K nearest neighbors), these systems employ a tag voting scheme based on the tags associated with the similar images in the image database. The number of votes for each tag candidate is output as the tag relevance score. However, in many scenarios, similar data may be annotated by similar annotators who tend to have similar tagging biases, causing the voting scheme to be skewed by these user tagging biases. For example, a group of retrieved similar images may be tagged by similar annotators with the keyword "sunset" even in instances where the focus of the image may actually be a person or other thing and the sunset is merely a background object. Because the similar annotators have tagged each image with "sunset", during the voting scheme, the tag relevance score may indicate "sunset" has received the most votes as the tag relevance score even if a sunset is not the focal point of the image. As a result of these and other limitations, such systems are often inadequate in accurately tagging and retrieving real-world images.

Embodiments of the present invention are generally directed to training a classifier (e.g., a CNN) to predict a set of tags (keywords) together with relevance scores (or probabilities) for an image. The predicted relevance-weighted tags (a tag that has been weighted with a corresponding tag relevance score) can be used in large-scale keyword-based image retrieval, image tag proposal, and image tag auto-completion based on user input. Implementations described herein utilize various algorithms in training a classifier and testing a classifier to improve the accuracy of the prediction. In particular, an enhanced clustering technique provides more balanced clusters which increases efficiency in training and reduces overfitting. Further, an enhanced voting scheme reduces the effect of tagging biases and provides better predictive performance, particularly for rare or very specific tags. Consequently, more accurate image retrieval results.

Initially, during training, a clustering technique (e.g., a modified recursive KMeans (R-KMeans) technique described below) is utilized to reduce cluster imbalance in the data that is input into the CNN, such as the one described above, for training feature data. The modified R-KMeans technique overcomes cluster imbalance by recursively applying KMeans clustering on remaining dominant clusters (clusters that have the majority of data points) after removing other clusters of desirable sizes. As a result, balanced clusters are generated for training the CNN feature in the image retrieval system. In some embodiments, the modified R-KMeans clustering technique can also be utilized to measure data point similarity (based on how many times the modified R-KMeans clustering technique results in a pair of data points being in the same cluster) that can be utilized for tag propagation (to tag untagged images). The tag propagation method, described in more detail below, improves the tag prediction performance for rare tags.

During testing, a diversity based voting framework is utilized to overcome user tagging biases. A voting scheme, the Div-KNN voting scheme, described in more detail below, employs a diversity-based voting framework to overcome user tagging biases by considering how similar user (i.e., image tag providers) are during voting. This framework enables votes from similar annotators to be consolidated to reduce the effect of user tagging biases. In some embodiments, bigram re-weighting is utilized during image retrieval to address the problem where the meaning of a word might be different than its meaning in a bigram. In this way, a keyword that is likely to be part of a bigram is down-weighted based on the predicted tag set.

Referring now to FIG. 1, a block diagram is provided that illustrates a tagging system 100 for predicting a set of tags, along with relevance scores, that can be used for keyword-based image retrieval, image tag proposal, and image tag auto-completion based on user input in accordance with an embodiment of the present invention. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory. The tagging system 100 may be implemented via any type of computing device, such as computing device 1100 described below with reference to FIG. 11, for example. In various embodiments, the tagging system 100 may be implemented via a single device or multiple devices cooperating in a distributed environment.

The tagging system 100 generally operates to predict a set of tags, along with relevance scores, for a set of images. As shown in FIG. 1, the tagging system 100 includes, among other components not shown, databases 1104A-104N, user devices 106A-106N, and a tagging engine 110. It should be understood that the tagging system 100 shown in FIG. 1 is an example of one suitable computing system architecture. Each of the components shown in FIG. 1 may be implemented via any type of computing device, such as computing device 1100 described with reference to FIG. 11, for example. The components may communicate with each other via a network 102, which may include, without limitation, one or more local area networks (LANs) and/or wide area networks (WANs). Such networking environments are commonplace in offices, enterprise-wide computer networks, intranets, and the Internet. It should be understood that any number of user devices, databases, and tagging engine may be employed within the tagging system 100 within the scope of the present invention. Each may comprise a single device or multiple devices cooperating in a distributed environment. For instance, the tagging engine 110 may be provided via multiple devices arranged in a distributed environment that collectively provide the functionality described herein. In another instance, the tagging engine 110 and one or more of the other components that comprise the tagging system 100 may be provided via a single device. Additionally, other components not shown may also be included within the network environment.

As shown in FIG. 1, the tagging system 100 includes databases 104A-104N. The databases 104A-104N may be utilized by the tagging engine 110 to store images, tags, and/or relevance scores. For example, based on an image provided by a user, such as via user devices 106A-106N, a feature may be learned by a CNN. The feature may be utilized to access a particular database of the databases. A score of each tag in the accessed database may be predicted for the image. Consequently, the tag with the highest score may be propagated to the image.

As show in FIG. 1, the tagging system 100 includes user devices 106A-106N. The user devices 106A-106N may be utilized by tag providers to tag images that are stored in the databases 104A-104N, users to provide images that are stored in the databases 104A-104N, and/or users that are performing an image search.

As shown in FIG. 1, the tagging engine 110 includes, among other things not shown, a training component 112, a propagation component 114, and prediction component 116. Initially, in some embodiments, the training component 112 utilizes a modified R-KMeans clustering technique to reduce cluster imbalance in the image data (e.g., feature vectors of the images) that is input into a CNN, such as the one described above, for training feature data. The training component 112 is generally configured to train a classifier that can later be used to classify or tag images. The classifier can be used for imaging tagging and/or image retrieval. A classifier can be any classifier that is used to classify (what is it classifying the image or tags). For example, a classifier may be a CNN. To train the classifier, sample images collected in a database, such as database(s) 104A-104N, are analyzed. Such images can be obtained from various users, such as user device(s) 106A-106N. To train the classifier, training component 112 extracts features (represented as feature vectors) from the sample images. Utilizing the extracted features, the training component 112 is trained to learn which features correspond to which labels (which are known in the set of training data). Initially, in some embodiments, the training component 112 utilizes a clustering technique, such as the modified R-KMeans technique described herein, to reduce cluster imbalance in the image data (e.g., feature vectors of the images) that is input into the CNN as training data.

Figure 2:
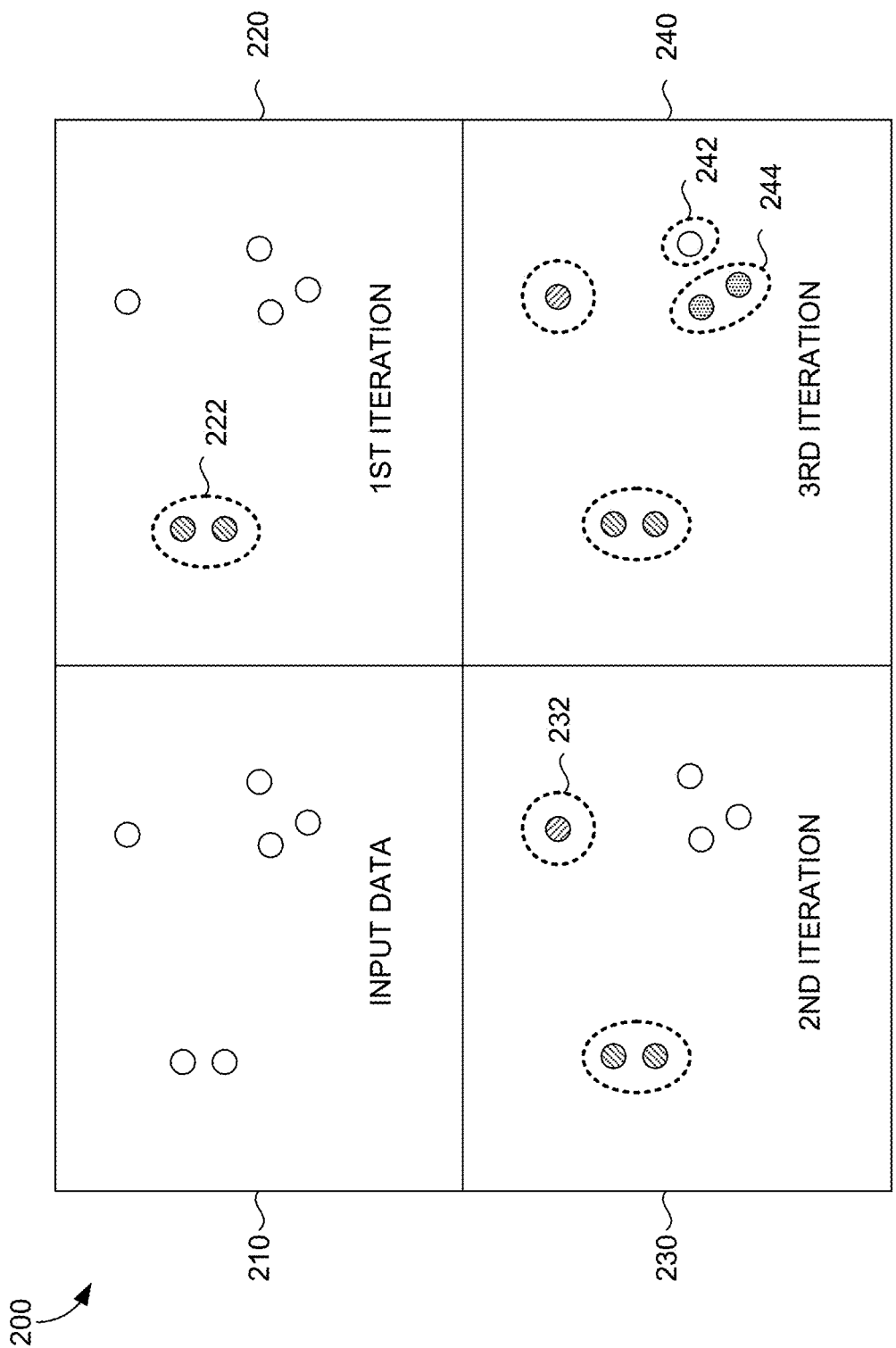
FIG. 2 is a diagram illustrating an exemplary recursive clustering technique that can be utilized to reduce cluster imbalance in the data that is input into a CNN in accordance with an embodiment of the present invention.

For example, and referring now to FIG. 2, the training component 112 recursively applies KMeans clustering on the remaining dominant clusters after removing other clusters of desirable sizes (which may be predetermined by a user). As shown, the input data 210 is initially unclustered prior to KMeans clustering. KMeans clustering is a method of partitioning groups of input data into clusters where each cluster is ostensibly similar. While typical KMeans clustering techniques result in clusters where a small number of clusters contains the majority of data points, the modified R-KMeans technique separates the data into clusters that contain a desired (e.g., equal, near-equal, or as desired by a user) number of data points. By avoiding imbalanced clusters, the CNN can be more accurately trained and image tagging and retrieval is improved. After the first KMeans iteration 220, a first cluster 222 of a desired size results. Any clusters of desirable sizes (e.g., the first cluster 222) are removed and a second KMeans iteration 230 is executed on the union of remaining clusters. Again, any clusters of desirable sizes (e.g., a second cluster 232) are removed and a third KMeans iteration 240 is executed on the union of remaining clusters. In this example after the third KMeans iteration, the remaining clusters have been divided (e.g., the third cluster 242 and the fourth cluster 244) into desirable sizes. As can be appreciated, any number of KMeans iterations may be executed until all the data has been divided into clusters of desirable sizes. As a result, balanced clusters comprising classes (e.g., similar images) can be generated and the CNN is trained by training component 112 for application in image tagging and retrieval.

Referring back to FIG. 1, the propagation component 114 is generally configured to tag images using the trained determined at the training component 112. Initially, the propagation component 114 utilizes the R-KMeans clustering technique to measure data point similarity between two data points (e.g., tags) in a cluster. To compute a cluster-sensitive hashing distance (C-Hashing distance) to measure the data point similarity, the R-KMeans algorithm can be applied a number of times, as described above. The C-Hashing distance between two data points represents a count of how many times the two data points are assigned to the same cluster. This similarity measure is adaptive to data distribution, and its similarity scores are more calibrated than common metrics like L2 distance, when the data distribution is highly uneven. The C-Hashing distance is utilized by propagation component 114 to determine a propagation probability, as described in more detail below. When the propagation probability is high (e.g., a particular threshold set by a user is reached), the tag is propagated to the untagged image.

In some embodiments, propagation component 114 improves the tag prediction performance for rare tags. Tag prediction performance for rare tags is often poor due to lack of data samples in the database. However, propagation component 114 computes the tag propagation probability based on the C-Hashing Distance and the empirical conditional probability (i.e., the number of times tag A co-occurs with tag B in an image's tag set divided by the total occurrence of tag B). A relevance score of a predicted tag (i.e., the confidence value of a tag assigned to a given input image) can be propagated to other similar tags in proportion to the tag propagation probability. In this way, rare tags may receive propagated relevance scores from other tags with similar meanings and, accordingly, images may be tagged with the rare tags.

Figure 3:
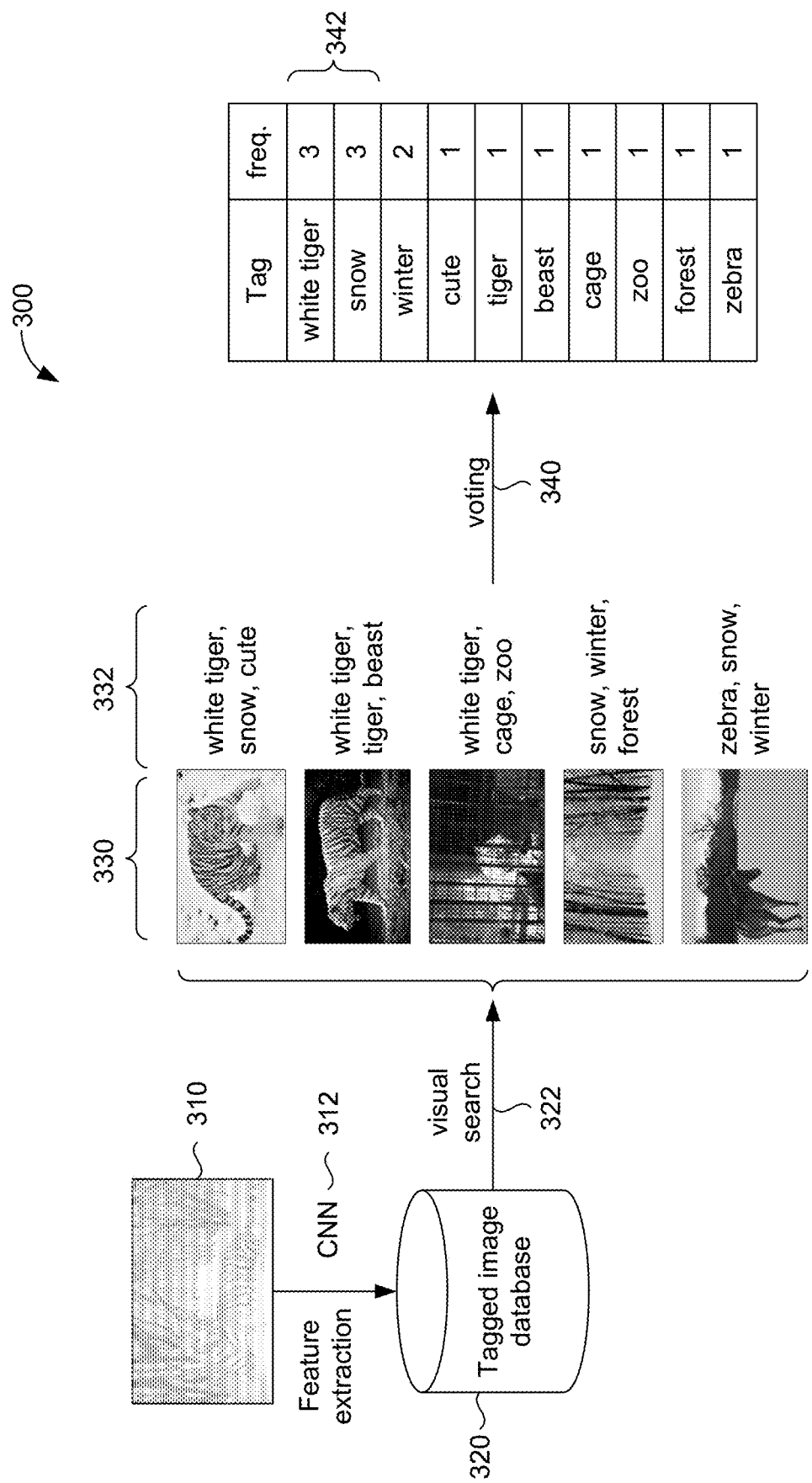
FIG. 3 is a diagram illustrating a baseline KNN voting scheme that is modified to remove user tagging biases in accordance with an embodiment of the present invention.

In some embodiments, testing component 116 utilizes a diversity based voting framework (Div-KNN) to overcome user tagging biases during testing. Testing refers to a process where the classifier tags untagged images that are provided by a user during image tagging. In a typical KNN voting framework, as illustrated in FIG. 3, features may initially be extracted from an image 310 by a CNN 312. These extracted features may influence the selection of a particular database 320 having images with tags. A visual search 322 can then be performed on the selected databased 320 and a set of images 330 having similar visual features is retrieved. Each of these images 330 may be associated with a number of tags 332. The number of tags are counted or voted 340 to determine the tag(s) that occur most frequently. The most frequent tag(s) 342 can be utilized to tag the image 310.

Figure 5B:
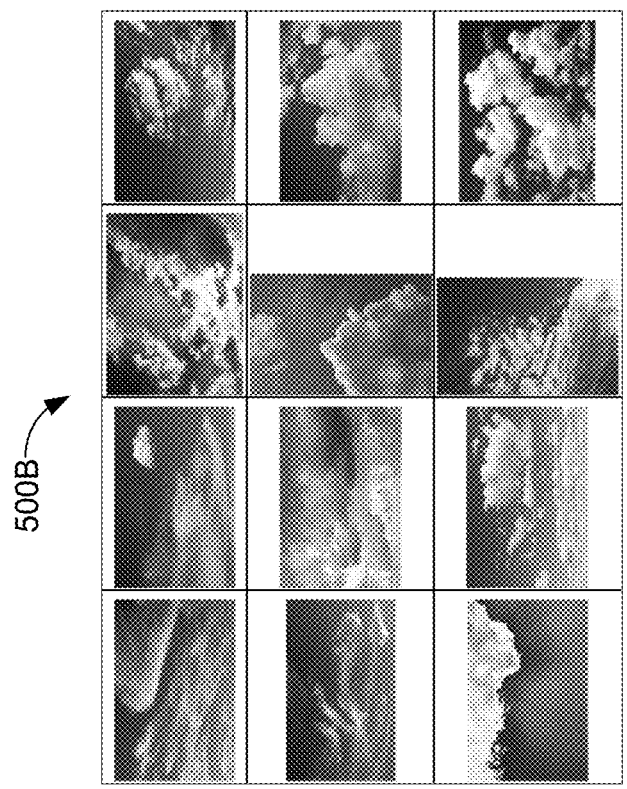
Figure 5A:
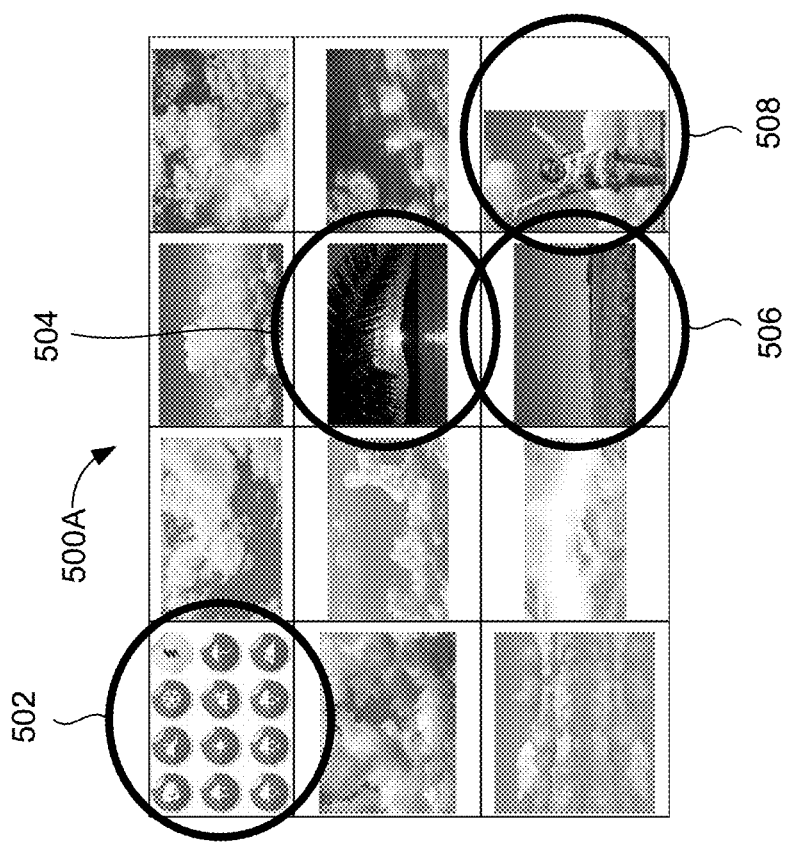

However, as described above, because the tags are voted on based on a selected database where similar data might be annotated by similar annotators who tend to have similar tagging biases, the voting scheme may be dominated by the user tagging biases. As shown in FIGS. 4 and 5, the typical KNN framework yields results that showcase these tagging biases in the form of undesirable images in the results set 400A, 500A. As shown in FIG. 4, in experimental testing, a search for "yogurt" utilizing the typical KNN framework provided four images 402, 404, 406, 408 that did not include yogurt. Similarly, in FIG. 5, in experimental testing, a search for "cloudy" utilizing the typical KNN framework provided four images 502, 504, 506, 508 that did not include clouds as the focal point of the image. Each of the results shown in 400A and 500A are undesirable for the user conducting the search.

Referring again to FIG. 1, the Div-KNN framework utilized by the testing component 116 does not utilize a simple vote count to tag an image. Instead, an effective number of votes is utilized, which considers how similar tag sequences are for a pair of images. In this way, the Div-KNN Framework can determine the degree of similarity of the image tag providers for the pair of images and eliminate or reduce tagging biases.

Turning back to FIGS. 4A-4B and 5A-5B, the Div-KNN framework yields results that reduce the tagging biases present in the results set 400A, 500A. As shown in FIG. 4B, in experimental testing, a search for "yogurt" utilizing the Div-KNN framework provided a results set 400B that does not include any images without yogurt. Similarly, in FIG. 5B, in experimental testing, a search for "cloudy" utilizing the Div-KNN framework provided a results set 500B that includes clouds as the focal point in all images. Each of the results shown in 400B and 500B are much more desirable for the user conducting the search than the results shown in 400A and 500A.

Figure 6:
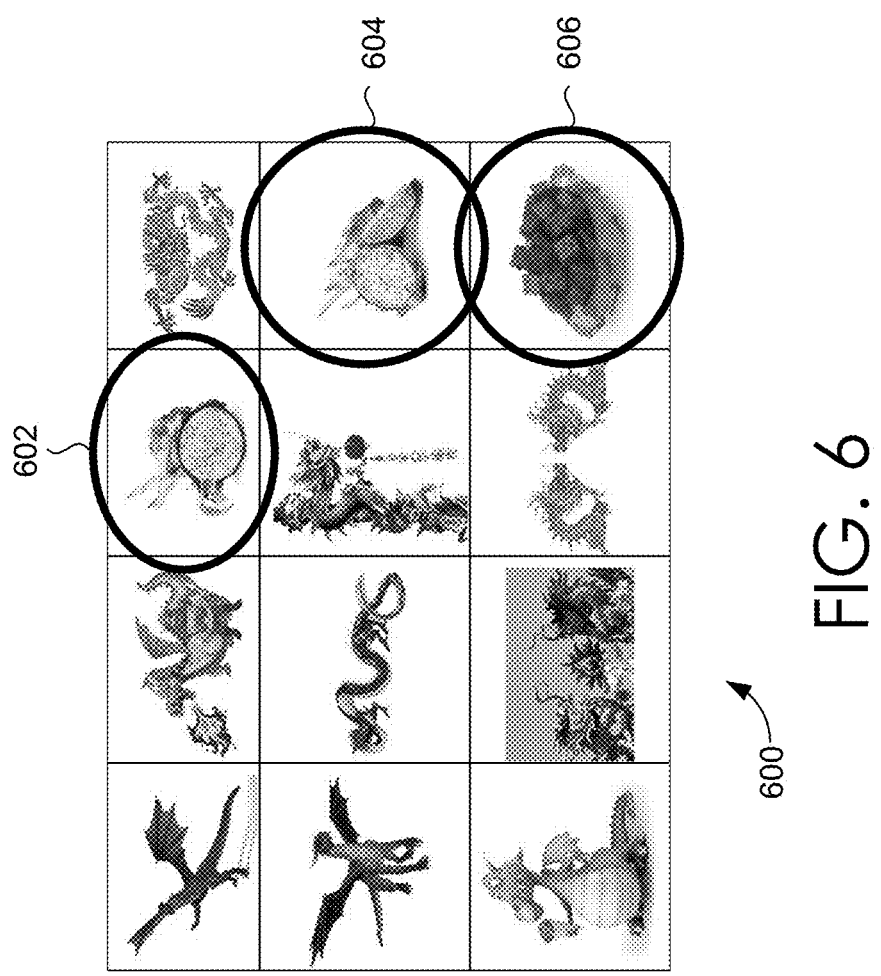
FIG. 6 is a diagram illustrating exemplary results where the use of bigram re-weighting can prevent undesirable results in accordance with an embodiment of the present invention.

In some embodiments, and referring also to FIG. 6, testing component 116 utilizes bigram re-weighting for word sense disambiguation where the meaning of a word might be very different than its meaning in a bigram. In the context of image tagging, bigram tags (e.g., "dragon fruit") are often split into unigrams (e.g., "dragon" and "fruit"). For example, when a user searches for "dragon", the user would find it undesirable to have images of "dragon fruit" 602, 604, 606 in the results 600. To address this problem, testing component 116 down-weights a tag pair that is likely to be part of a bigram (e.g., "dragon fruit") based on the predicted tag set.

In some embodiments, testing component 116 utilizes a framework for learning low-dimensional spaces to speed up online training. For example, when feature dimension is high (i.e., a large number of distinct features relative to training samples), training online classifiers can be very time-consuming and processor-intensive. Further, the classifier is prone to overfitting (where the classifier has memorized rather than learned to generalize during training) during testing which results in poor predictive performance. To address these issues, the testing component 116 maps the query image and its nearest neighbors into a low-dimension space (i.e., a small number of distinct features relative to training samples). For example, given an image, the Div-KNN voting scheme may identify candidate tags. If a particular tag candidate is not confident enough, an off-line trained linear projection matrix projects the image and its K-nearest neighbors to the low-dimension space. A classifier for the particular tag candidate can be trained in the low-dimension space using the K-nearest neighbors as training samples. The image's score for the particular tag can be computed as the classifier's confidence score. The testing component 116 can then train a classifier for an image tag in the low-dimensional space using the nearest neighbors as training samples. The resulting score for that tag is computed by the testing component 116 as the classifier's confidence score. As a result, the image may be tagged with particular tag.

Figure 7:
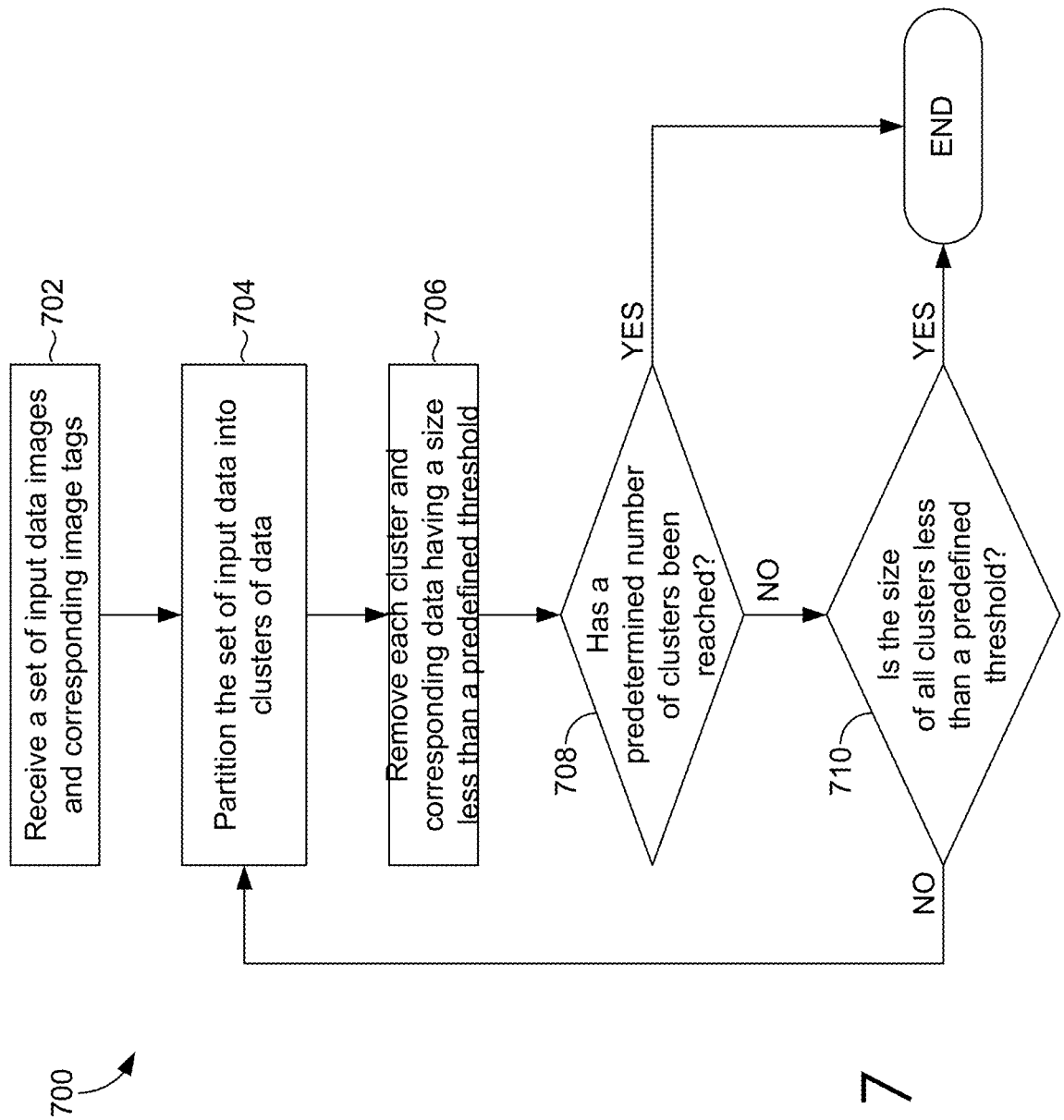
FIG. 7 is a flow diagram showing method for addressing cluster imbalance in accordance with an embodiment of the present invention.
Figure 10:
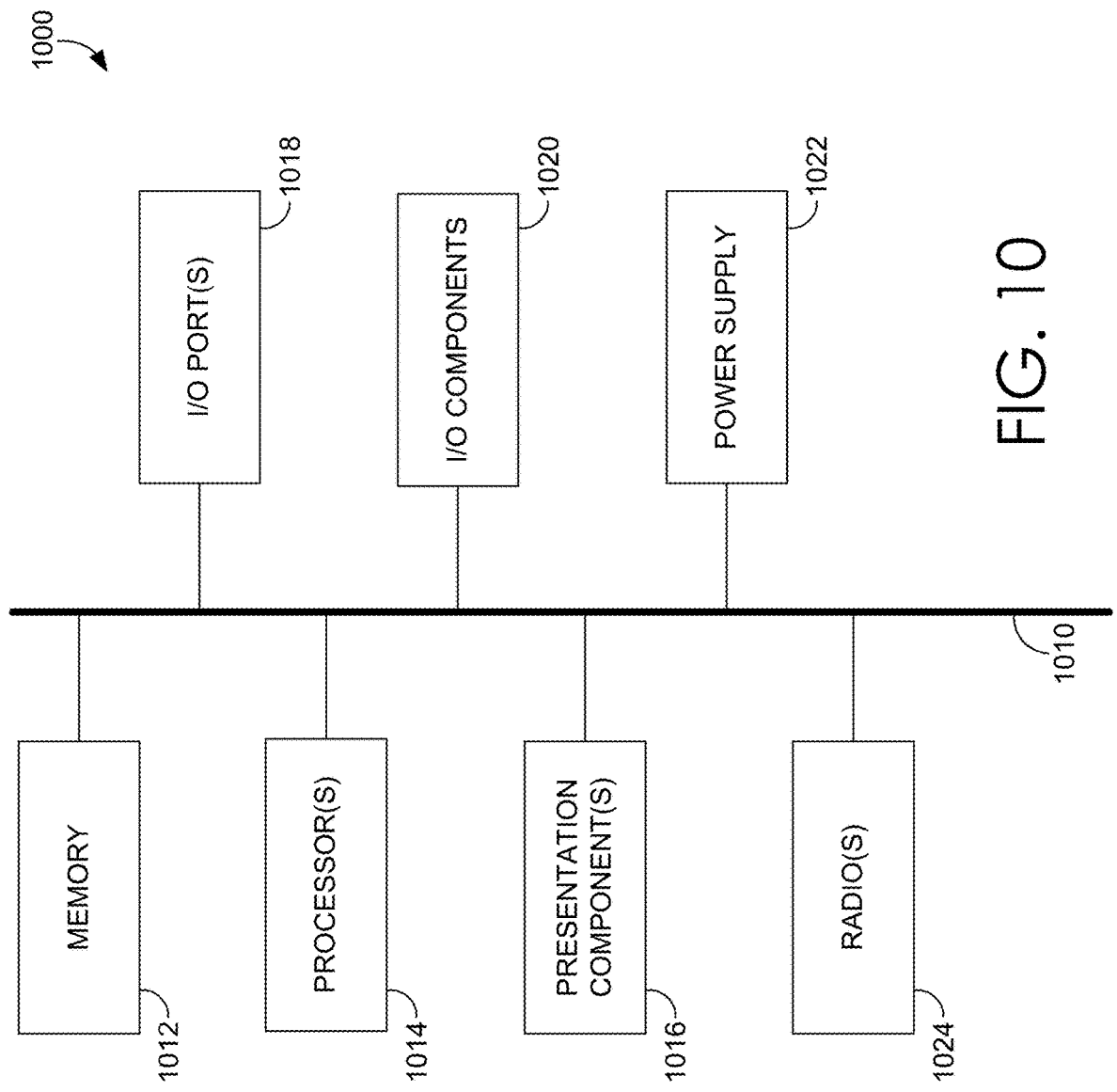
FIG. 10 is a block diagram of an exemplary computing environment suitable for use in implementing embodiments of the present invention.

Turning now to FIG. 7, a flow diagram is provided that illustrates a method 700 for addressing cluster imbalance in accordance with an embodiment of the present invention. For instance, the method 700 may be employed utilizing the tagging system 100 of FIG. 1. As shown at step 702, a set of input data including images and corresponding image tags is initially received. The input data may be stored in and received from an image database. The input data is utilized to train a classifier (e.g., CNN) so that an image feature may be extracted from the CNN for a given image and a relevance score of a tag can be predicted. However, as noted above, in a typical KMeans clustering algorithm, a small number of dominant clusters receive the majority of data points (resulting in imbalanced clusters).

To overcome cluster imbalance, data form the set of input data is partitioned into clusters, at step 704, utilizing the modified R-KMeans technique. To do so, a maximum cluster size and/or a number of desired clusters may be defined by a user. During the R-KMeans process, KMeans is utilized to divide the input data into a number of clusters. Each cluster that is less than the predefined size is removed, at step 706. It is then determined, at step 708, whether the predetermined number of clusters has been reached. If it has, the input data has been clustered without cluster imbalance and the process ends. It is also determined, at step 710, whether the size of all clusters in the number of clusters is less than a predefined threshold. If it is, the input data has been clustered without cluster imbalance and the process ends.

If neither end condition is met, the process repeats with the remaining data that is not in a cluster that has been removed. As described above, this process repeats until a maximum number of clusters have been added to the cluster set or the size of each of the clusters resulting from an R-KMeans iteration is below a predefined threshold.

In some embodiments, the R-KMeans technique is utilized to compute a cluster-sensitive hashing distance (C-Hashing distance) for two data points in the set of input data. Referring now to FIG. 8, a flow diagram is provided that illustrates a method 800 for improving tag prediction performance for rare tags, in accordance with an embodiment of the present invention. For instance, the method 800 may be employed utilizing the image tagging system 100 of FIG. 1. As shown at step 802, a set of input data comprising image tags is received.

A C-Hashing distance is computer, at step 804, for two data points in the set of input data. To do so, the number of times the two data points are assigned to a same cluster is counted, at step 906. The C-Hashing distance is calculated as (the number of iterations of R-KMeans minus the number of times the two data points are assigned to the same cluster) divided by the number of iterations of R-KMeans.

In some embodiments, the C-Hashing distance is computed where each tag is represented as a feature vector based on a context-window co-occurrence matrix. Each row of the matrix corresponds to a tag and each entry represents the number of times that a second tag occurs in the context window of a first tag. To generate the feature vector for the C-Hashing distance, a row normalization of the matrix is performed so that each row sums up to 1. The square root of each entry of the row-normalized matrix is performed followed by a PCA dimension reduction to reduce the feature dimension. Each row of the resultant matrix represents the feature vector of the corresponding tag which can be used to compute the C-Hashing distance.

A tag propagation probability can be computed, at step 908, based on the C-Hashing distance and an empirical condition probability. The empirical condition probability is defined as (the number of times a first tag co-occurs with a second tag in an image's tag set) divided by the total occurrences of the second tag. To determine the tag propagation probability from the second tag to the first tag, the C-Hashing distance is multiplied by the empirical condition probability. Although the C-Hashing distance is a symmetric distance measure, the empirical condition probability is not, which helps to hinder the relevance propagation from more general words to more specific words. In this way, a relevance score for a predicted tag can be propagated, at step 910, to other similar tags in proportion to the tag propagation probability. This can improve the tag prediction performance for rare tags.

Referring now to FIG. 9, a flow diagram is provided that illustrates a method 900 for addressing user tagging biases, utilizing a Div-KNN Framework, in accordance with an embodiment of the present invention. For instance, the method 900 may be employed utilizing the image tagging system 100 of FIG. 1. Initially a CNN may be utilized to extract features from an input image. The features may be utilized to select an image database. As shown at step 902, a set of input data comprising images and associated image tags is received. The set of input data is received from the selected database based on the extracted features of the input image.

It is determined how similar image tag providers are for a pair of images, at step 804. To do so, an effective number of votes for a particular tag is determined, which considers how similar tag sequences are for a pair of images in an image set received from the image database. In this way, the Div-KNN Framework can determine the degree of similarity of the image tag providers for the pair of images and eliminate or reduce tagging biases.

The effective number can be formulated as $$\frac{1}{1-Q},$$

where $$Q = \frac{1}{N^2} \sum_{k=1}^{N} \sum_{j=1}^{N} d_{i,j},$$

where $0 \leq d_{i,j} \leq 1$. In this formulation, N represents the number of votes for a particular tag for each of the nearest neighbors of the input image, di, j represents the pair-wise distance function which returns the distance for all pairs of instances in the image set, and may be further defined by: $d_{i,j} = \alpha f_{tag}$ (i,j)+$(1-\alpha)f_{usr}$(i,j), where $f_{tag}$(i, j) measures how similar the tag sequences of instances i and j are and $f_{usr}$(i, j) is a distance function reflecting how close the users (image tag providers) of i and j are. In practice, a user identification associated with the image and other metadata may be utilized to measure the user distance.

In some embodiments, a C-Hashing distance is computed for two data points in the set of input data. A tag propagation probability based on the C-Hashing distance and an empirical condition probability can then be computed, as described above. The relevance score of a predicted tag can be propagated to other similar tags in proportion to the tag propagation probability.

In some embodiments, a keyword that is likely to be part of a bigram is down-weighted based on a predicted tag set. This decreases the tags that may come from a bigram. The keyword can be down-weighted by applying $$S_i' = S_i - \gamma \max_{j \in B_i} \min \{S_j, S_i\},$$

where $B_i \triangleq \{x_j \in T: x_i \text{ and } x_j \text{ compose a bigram in } T\}$ and $T=\{T_i\}_{i=1}^n$ denotes a dictionary of tags, and $\{S_i\}_{i=1}^n$ denotes predicted relevance scores for a given image.

In some embodiments, Partial Linear Squares (PLS) are utilized for each tag to learn a low dimensional linear projection. This enables a high dimension image feature to be projected to a low dimension space. A support vector machine (SVM) classifier can then be trained for a dictionary of tags in the low dimensional space using k nearest neighbors as training samples. Confidence scores (i.e., the output classification scores from SVM classification) can then be computed for each tag for a query image.

Having described embodiments of the present invention, an exemplary operating environment in which embodiments of the present invention may be implemented is described below in order to provide a general context for various aspects of the present invention. Referring to FIG. 11 in particular, an exemplary operating environment for implementing embodiments of the present invention is shown and designated generally as computing device 1100. Computing device 1100 is but one example of a suitable computing environment and is not intended to suggest any limitation as to the scope of use or functionality of the invention. Neither should the computing device 1100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 11, computing device 1100 includes a bus 1110 that directly or indirectly couples the following devices: memory 1112, one or more processors 1114, one or more presentation components 1116, input/output (I/O) ports 1118, input/output components 1120, and an illustrative power supply 1122. Bus 1110 represents what may be one or more busses (such as an address bus, data bus, or combination thereof). Although the various blocks of FIG. 11 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 11 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 11 and reference to "computing device."

Computing device 1100 typically includes a variety of computer-readable media. Computer-readable media can be any available media that can be accessed by computing device 1100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1100. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1112 includes computer-storage media in the form of volatile and/or nonvolatile memory. The memory may be removable, non-removable, or a combination thereof. Exemplary hardware devices include solid-state memory, hard drives, optical-disc drives, etc. Computing device 1100 includes one or more processors that read data from various entities such as memory 1112 or I/O components 1120. Presentation component(s) 1116 present data indications to a user or other device. Exemplary presentation components include a display device, speaker, printing component, vibrating component, etc.

I/O ports 1118 allow computing device 1100 to be logically coupled to other devices including I/O components 1120, some of which may be built in. Illustrative components include a microphone, joystick, game pad, satellite dish, scanner, printer, wireless device, etc. The I/O components 1120 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye tracking, and touch recognition associated with displays on the computing device 1100. The computing device 1100 may be equipped with depth cameras, such as, stereoscopic camera systems, infrared camera systems, RGB camera systems, and combinations of these for gesture detection and recognition. Additionally, the computing device 1100 may be equipped with accelerometers or gyroscopes that enable detection of motion. The output of the accelerometers or gyroscopes may be provided to the display of the computing device 1100 to render immersive augmented reality or virtual reality.

As can be understood, embodiments of the present invention provide an automated image tagging system that can predict a set of tags, along with relevance scores, that can be used for keyword-based image retrieval, image tag proposal, and image tag auto-completion based on user input. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A computer-implemented method comprising:
   inputting an image into a trained image classifier, wherein the trained image classifier is based on a recursive clustering process that generates data clusters, wherein a step in the recursive clustering process comprises partitioning data into clusters and recombining all clusters from the clusters with a size exceeding a predefined threshold prior to a subsequent partitioning;
   determining, for the image, a related data cluster from the data clusters of the trained image classifier, the related data cluster comprising a set of training images and corresponding tags; and
   propagating a tag to the image, the tag selected from the corresponding tags of the set of training images.

2. The method of claim 1, wherein the related data cluster is identified using a similarity analysis of features in the image in relation to the data clusters.

3. The method of claim 1, wherein the tag is selected from the corresponding tags of the set based on a relevance score.

4. The method of claim 3, wherein the relevance score is determined using a confidence value of the tag based on a measure of similarity between two of the corresponding tags in the related data cluster, wherein the tag is one of the two corresponding tags.

5. The method of claim 4, wherein determining the measure of similarity between the two corresponding tags in the cluster further comprises finding a cluster-sensitive hashing distance representing a number of times the two corresponding tags are assigned to a same cluster in relation to iterations of the recursive clustering process.

6. The method of claim 3, wherein the relevance score comprises a confidence value of the tag and down-weighting the tag when the tag is determined to be part of a bigram based on a predicted tag set.

7. The method of claim 3, wherein the relevance score is determined by assigning an effective number of votes to the tag based on a first similarity between tag sequences for a first image and a second image in relation to a second similarity between a first image tag provider of the tag and a second tag provider of a second tag.

8. The method of claim 1, wherein the tag selected from the corresponding tags has a highest relevance score.

9. The method of claim 1, further comprising:
using a support vector machine (SVM) classifier for a dictionary of tags to determine a confidence value for the tag, wherein the SVM classifier is trained in a lower dimensional space using k nearest neighbors as training samples.

10. A non-transitory computer storage medium comprising computer-useable instructions that, when used by one or more computing devices, cause the one or more computing devices to perform operations comprising:
inputting an image into a trained image classifier, wherein the trained image classifier is based on a recursive clustering process that generates data clusters, wherein a step in the recursive clustering process comprises partitioning data into clusters and recombining all clusters from the clusters with a size exceeding a predefined threshold prior to a subsequent partitioning;
determining, for the image, a related data cluster from the data clusters of the trained image classifier, the related data cluster comprising a set of training images and corresponding tags, the related data cluster identified from a similarity analysis of features in the image in relation to the data clusters; and
propagating a tag to the image, the tag selected from the corresponding tags of the set of training images.

11. The non-transitory computer storage medium of claim 10, wherein the tag is selected from the corresponding tags of the set based on a relevance score.

12. The non-transitory computer storage medium of claim 11, wherein the relevance score is determined using a confidence value of the tag based on a measure of similarity between two of the corresponding tags in the related data cluster wherein the tag is one of the two corresponding tags.

13. The non-transitory computer storage medium of claim 12, wherein determining the measure of similarity between the two corresponding tags in the cluster further comprises finding a cluster-sensitive hashing distance representing a number of times the two corresponding tags are assigned to a same cluster in relation to iterations of the recursive clustering process.

14. The non-transitory computer storage medium of claim 11, wherein the relevance score comprises a confidence value of the tag and the tag is down-weighted when determined to be part of a bigram based on a predicted tag set.

15. The non-transitory computer storage medium of claim 11, wherein the relevance score is determined by assigning an effective number of votes to the tag based on a first similarity between tag sequences for a first image and a second image in relation to a second similarity between a first image tag provider of the tag and a second tag provider of a second tag.

16. The non-transitory computer storage medium of claim 10, wherein the tag selected from the corresponding tags has a highest relevance score.

17. The non-transitory computer storage medium of claim 10, further comprising:
using a support vector machine (SVM) classifier for a dictionary of tags to determine a confidence value for the tag, wherein the SVM classifier is trained in a lower dimensional space using k nearest neighbors as training samples.

18. A computing system comprising:
means for inputting an image into a trained image classifier, wherein the trained image classifier is based on a recursive clustering process that generates data clusters, wherein a step in the recursive clustering process comprises partitioning data into clusters and recombining all clusters from the clusters with a size exceeding a predefined threshold prior to a subsequent partitioning;
means for determining, for the image, a related data cluster from the data clusters of the trained image classifier, the related data cluster comprising a set of training images and corresponding tags; and
means for propagating a tag to the image, the tag selected from the corresponding tags of the set of training images.

19. The system of claim 18 further comprising:
means for determining a relevance score for the tag; and
selecting the tag from the corresponding tags of the set of training images based on the relevance score.

* * * * *